United States Patent
Balfour, Jr.

(10) Patent No.: US 10,007,081 B2
(45) Date of Patent: Jun. 26, 2018

(54) BUFFER TUBE PULLBACK PREVENTER ASSEMBLY

(71) Applicant: Electric Motion Company, Inc., Winsted, CT (US)

(72) Inventor: William J. Balfour, Jr., Torrington, CT (US)

(73) Assignee: Electric Motion Company, Inc., Winsted, CT (US)

( * ) Notice: Subject to any disclaimer, the term of this patent is extended or adjusted under 35 U.S.C. 154(b) by 0 days. days.

(21) Appl. No.: 15/235,282

(22) Filed: Aug. 12, 2016

(65) Prior Publication Data
US 2017/0045704 A1 Feb. 16, 2017

Related U.S. Application Data

(60) Provisional application No. 62/205,020, filed on Aug. 14, 2015.

(51) Int. Cl.
*G02B 6/44* (2006.01)
(52) U.S. Cl.
CPC .................. *G02B 6/4477* (2013.01)
(58) Field of Classification Search
CPC ................ G02B 6/4477; G02B 6/44
USPC .......... 385/100–109, 135–139, 147
See application file for complete search history.

(56) References Cited

U.S. PATENT DOCUMENTS

| | | | | | |
|---|---|---|---|---|---|
| 4,055,875 A | * | 11/1977 | Strickland | ............... | F16G 11/02 24/115 N |
| 4,366,938 A | * | 1/1983 | McSpadden | ............ | F16G 11/02 174/DIG. 8 |
| 4,498,507 A | * | 2/1985 | Thompson | ............ | B65B 13/345 140/93.2 |
| 5,440,665 A | * | 8/1995 | Ray | ........................ | B82Y 15/00 385/106 |
| 5,642,451 A | * | 6/1997 | Kennedy | ............... | G02B 6/2558 385/99 |
| 5,657,413 A | * | 8/1997 | Ray | ........................ | B82Y 15/00 385/100 |
| 5,758,004 A | * | 5/1998 | Alarcon | ............... | G02B 6/4471 174/93 |
| 5,793,920 A | * | 8/1998 | Wilkins | ............... | G02B 6/4446 385/135 |
| 8,903,216 B2 | * | 12/2014 | Thompson | ............ | G02B 6/4477 385/134 |
| 2011/0033157 A1 | * | 2/2011 | Drouard | ............... | G02B 6/4477 385/77 |
| 2012/0308184 A1 | * | 12/2012 | Pina | ..................... | G02B 6/4465 385/102 |
| 2014/0355936 A1 | * | 12/2014 | Bund | ................... | G02B 6/3825 385/81 |

* cited by examiner

*Primary Examiner* — Akm Enayet Ullah
(74) *Attorney, Agent, or Firm* — Alix, Yale & Ristas, LLP

(57) ABSTRACT

A strain relief for a buffer tube employs a plurality of spline-like grippers which are angularly positionable about the buffer tube. The grippers each have an outwardly projecting retainer loop. A cable tie having a strap is passed through the loops and through a one-way catch to secure the spline-like grippers to the buffer tube. The ends of the grippers function as an engagement end to prevent the buffer tube from pulling back from an enclosure.

19 Claims, 10 Drawing Sheets

BUFFER TUBE PULLBACK PREVENTER ASSEMBLY

BACKGROUND

The present disclosure relates generally to fiber optic cable systems. More particularly, the present disclosure relates to devices and methods which are employed to prevent buffer tube pullout from an enclosure.

The installation and maintenance of the fiber optic cable systems must account for the tendency of the buffer tube to pull back and to bring the fibers into the cable due to cold weather, the pulling forces on the cable and other adverse conditions which affect the position of the buffer tube. In very cold weather, the buffer tubes, which are connected within an enclosure, may actually pull back to such an extent that they pull out of the enclosure, and the buffer tube will actually retreat relative to the fibers. The present disclosure seeks to address the buffer tube pullback phenomena.

SUMMARY

Briefly stated, a strain relief for a buffer tube comprises a plurality of elongated spline-like grippers. Each of the grippers has a first surface which extends a first distance and a second surface generally uniformly spaced from the first surface. The second surface extends a second distance greater than the first distance. Each spline has at least one integrally protruding retainer loop. A tie comprising a one-way catch and a strap is employed so that the grippers are angularly arrangeable about a buffer tube and the strap is looped through the retainer loops and pulled through the catch to secure the spline-like grippers in a fixed longitudinal position about the tube.

The grippers are preferably made of rubber or plastic and are substantially identical. In one embodiment, each gripper has two longitudinally spaced loops and the loops align in pairs longitudinally aligned relative to the buffer tube. A second tie may be looped through retainer loops. The first surface and the second surface are arcuate and the grippers have uniform length in one embodiment. In another embodiment, the grippers are flexibly joined. Each of the grippers has an engagement end substantially perpendicular to the first and the second surfaces.

A strain relief buffer tube comprises a plurality of elongated spline-like grippers. Each of the grippers has a first surface and an opposed second surface generally uniformly spaced from the first surface. The first surface has at least one retainer loop. The grippers are angularly arrangeable about a buffer tube wherein a tie comprising a strap and a catch is employed so that the strap is looped through the retainer loops and secured by the catch to secure the spline-like grippers in a fixed longitudinal position about the tube. The grippers have an arcuate shape and are preferably substantially identical. Each gripper has two longitudinally spaced outwardly projecting retainer loops. A pair of ties each having a strap and one-way catch are looped through the retainer loops and secured by the catch.

A strain relief assembly comprises a buffer tube and a plurality of elongated spline-like grippers. Each of the grippers has a first surface extending a first arcuate distance and angularly spaced about the buffer tube. The grippers each have a second surface uniformly spaced from the first surface and have at least one integrally protruding retainer loop. A tie comprises a strap extending through the loops. The tie also has a one-way catch. The strap is pulled through the catch to secure the spline-like grippers in a fixed longitudinal position about the tube.

The grippers are preferably made of rubber or plastic. The tie is preferably a cable tie. The grippers are preferably substantially identical so that each gripper has an end and the ends generally longitudinally align. Each gripper has two longitudinally spaced integral loops. The loops longitudinally align in pairs relative to the buffer tube. The strain relief assembly further comprises a second tie which loops through retainer loops and secured by a one-way catch. The grippers are generally equiangularly spaced about the buffer tube.

BRIEF DESCRIPTION OF THE ILLUSTRATIONS

DETAILED DESCRIPTION

Figure 1:
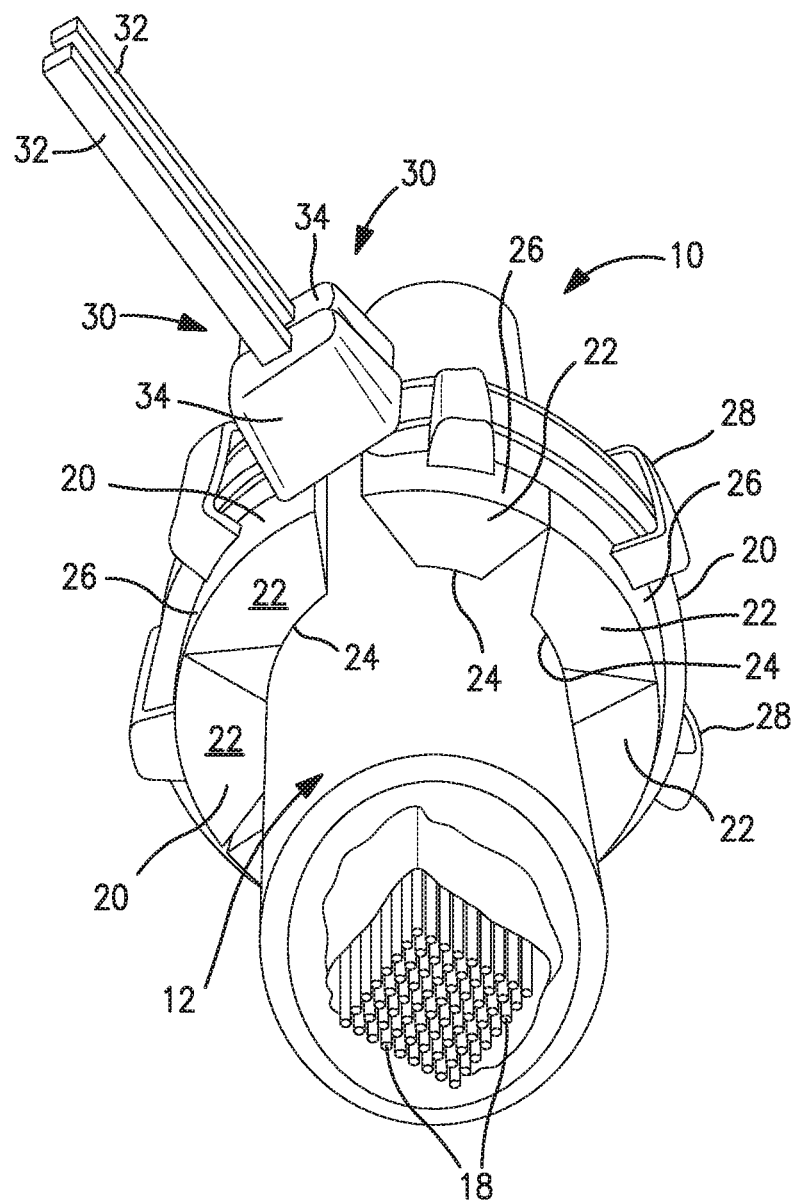
FIG. 1 is a perspective view of a strain relief installed on a buffer tube of an optical cable.

With reference to the drawings wherein like numerals represent like parts throughout the figures, a buffer tube strain relief is generally designated by the numeral 10. The strain relief 10 is affixed to a portion of the buffer tube 12 at an interior tube location in an enclosure or cabinet (not illustrated) to prevent pullback of the tube. The tube 12 surrounds multiple fiber optic strands 18.

The strain relief 10 is comprised of a plurality of elongated spline-like grippers 20 which are mountable about the exterior surface of the buffer tube designated by the numeral 12. The grippers 20 are angularly disposed about the central axis of the buffer tube and may be slightly angularly spaced. The spline-like grippers 20 are preferably connected together by two cable ties 30 wrapped around the buffer tubes. Each cable tie 30 is pulled and thereby locked to provide sufficient tension to secure the grippers 20 at a fixed longitudinal position on the buffer tube. The longitudinal ends 22 of the grippers function as abutment surfaces or stops to prevent the tube from being pulled through the fiber cable opening of the enclosure (not illustrated).

The spline-like grippers 20 are preferably identical and have the same longitudinal length. In one preferred form, the grippers are made of hard rubber, although they may also be manufactured from plastics or other suitable rigid materials which effectively grip against the buffer cable. Each gripper 20 preferably has a quasi-arcuate or keystone-like section with an inner arcuate surface 24 and a coaxial outer arcuate surface 26. It will be appreciated that the outer surface 26 has an arcuate length greater than that of the arcuate length of the inner surface 24. In some embodiments, the surfaces 24 and 26 may have a step-type configuration rather than a smooth contour.

A pair of aligned retainer loops 28 integrally protrudes from the outer surface 26 and defines a tandem belt or strap retainer about the arcuate surface. In a preferred form, there are two longitudinally spaced and aligned identical loops 28 for each gripper 20. For some embodiments (not illustrated), one or more than two loops may be provided on each gripper.

The cable tie 30 comprises a strap 32 with a series of serrations which are engaged by a one-way catch 34 upon passing the strap through the catch. The cable tie 30 is principally formed from plastic, but may have a metal catch mechanism. One preferred cable tie embodiment is a Thomas & Betts cable tie.

Figure 2:
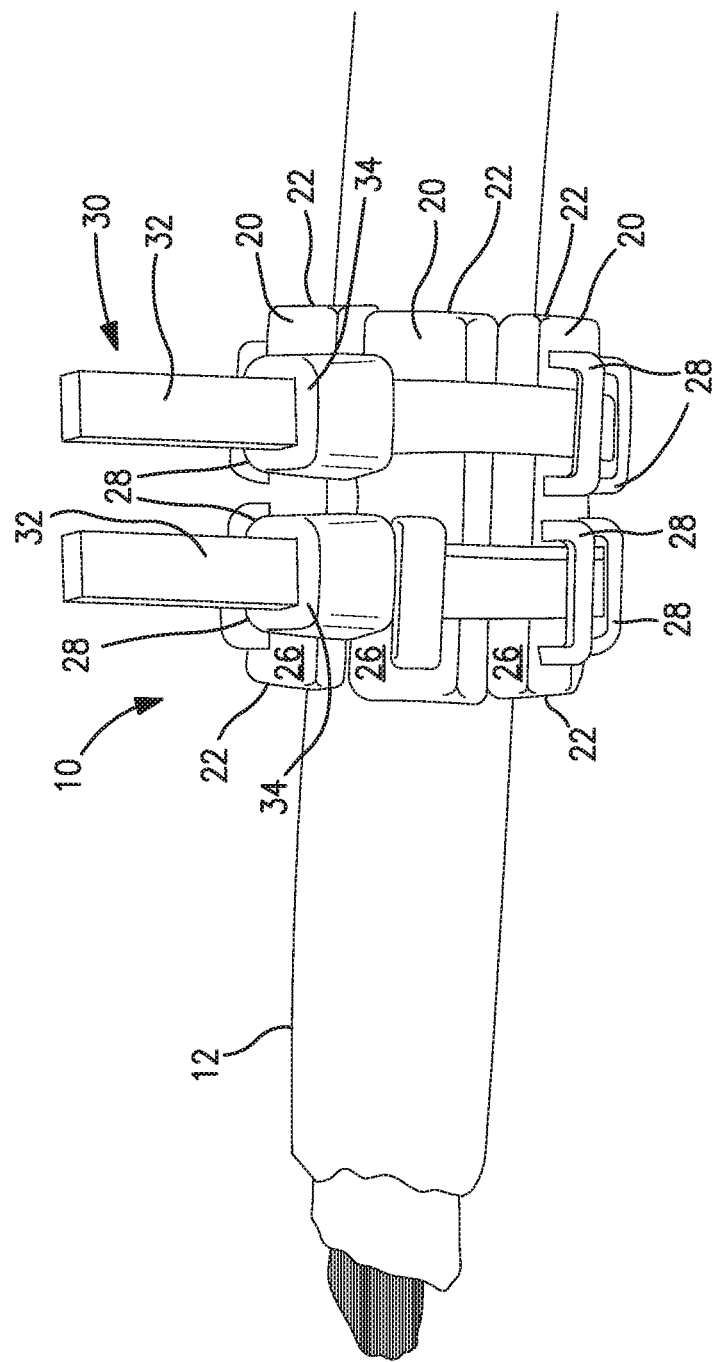
FIG. 2 is a view of the strain relief, buffer tube and cable of FIG. 1 from a generally side view thereof.
Figure 3:
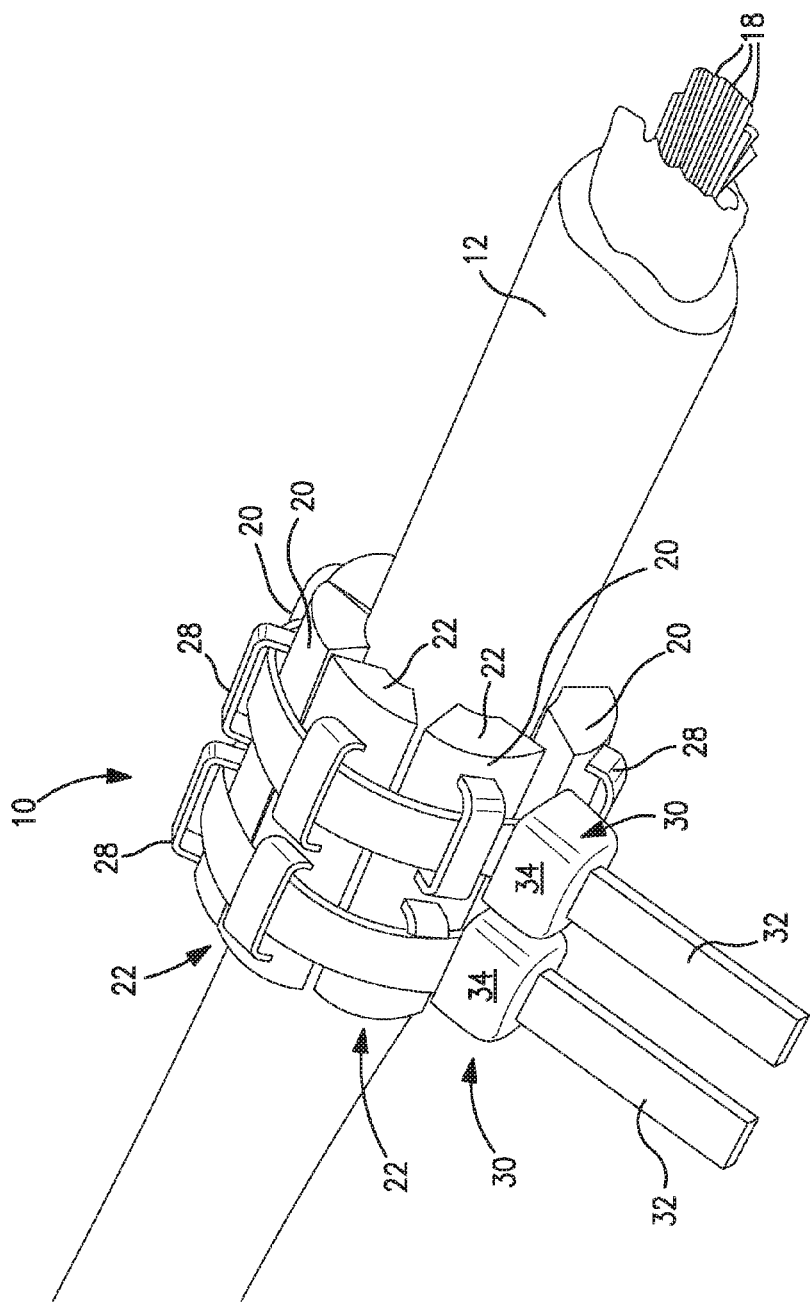
FIG. 3 is a view of the strain relief, buffer tube and cable of FIG. 1 from a different side perspective.
Figure 4:
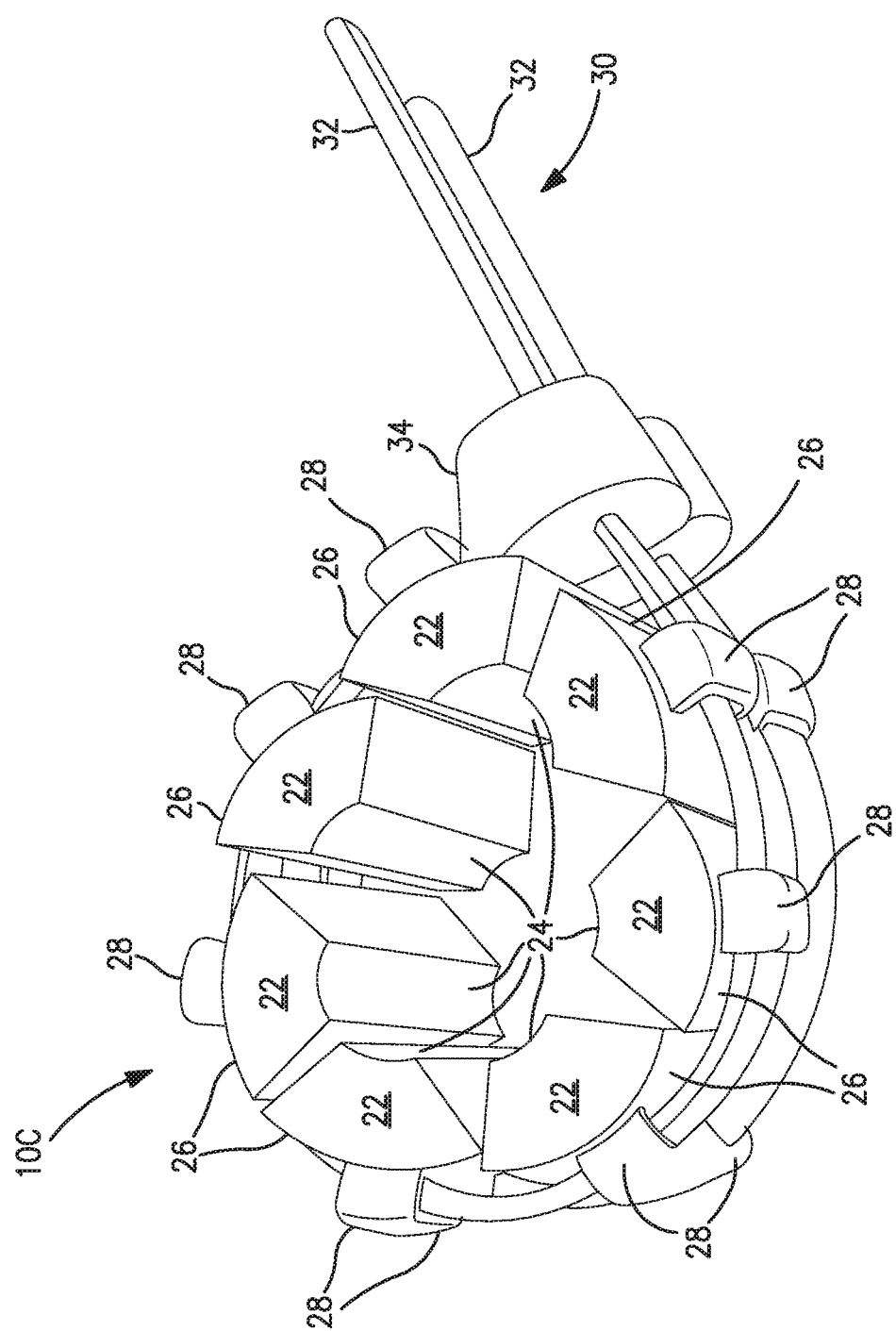
FIG. 4 is a perspective view of a modified embodiment of a strain relief prior to installation.
Figure 5:
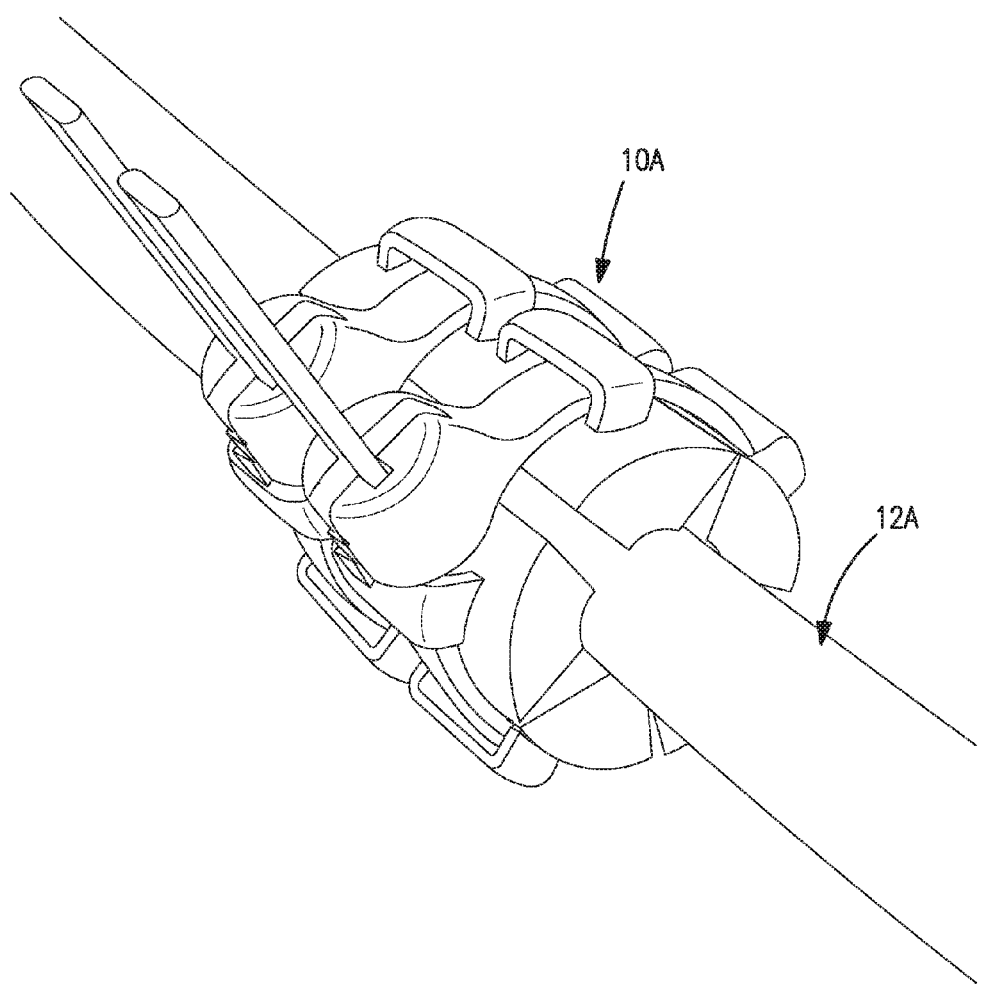
FIG. 5 is a perspective view of another embodiment of a strain relief mounted to a buffer tube having a smaller diameter than the buffer tube of FIG. 1.
Figure 6:
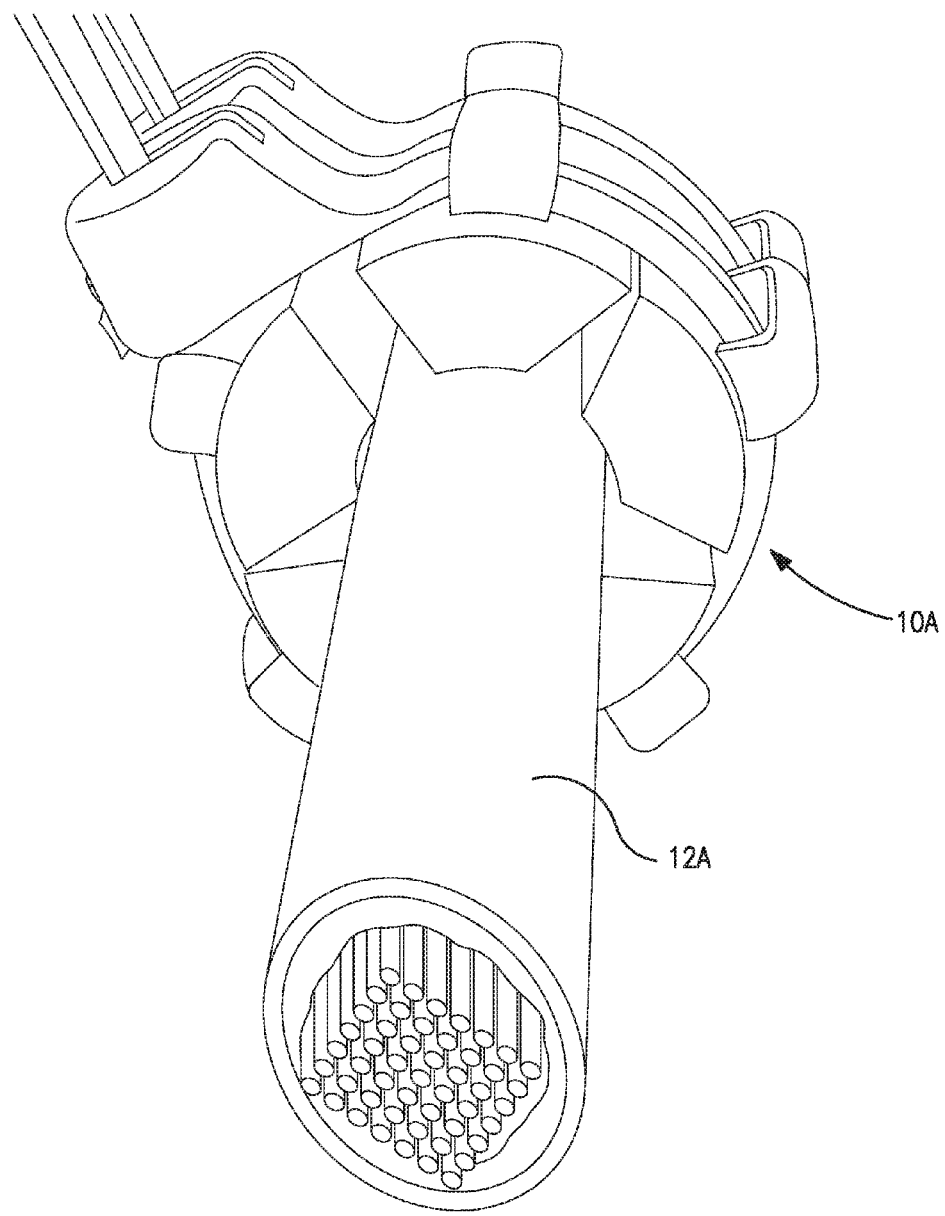
FIG. 6 is a view of the strain relief and buffer tube of FIG. 5 from a different perspective.
Figure 7:
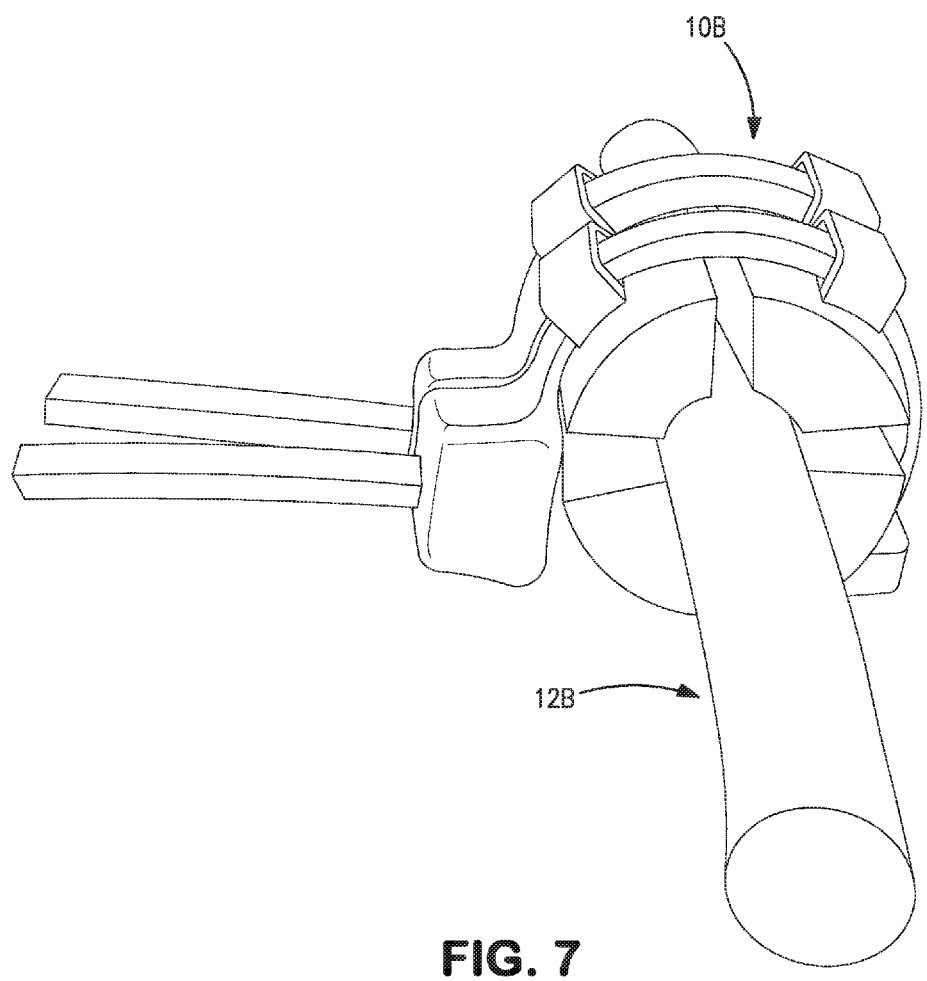
FIG. 7 is a perspective view of yet another embodiment of a strain relief mounted to a buffer tube having a smaller diameter than that of FIG. 5.
Figure 8:
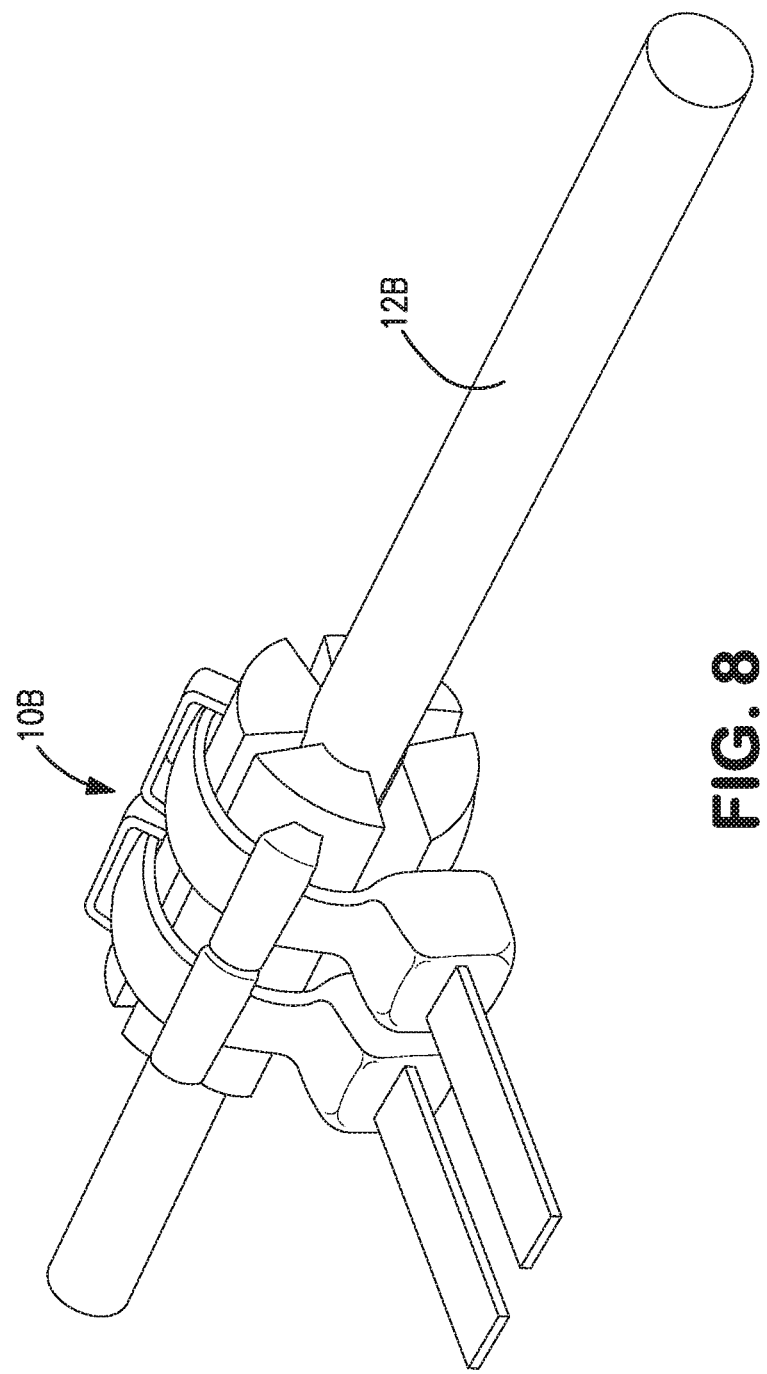
FIG. 8 is a view of the strain relief and buffer tube of FIG. 7 from a different perspective.
Figure 9:
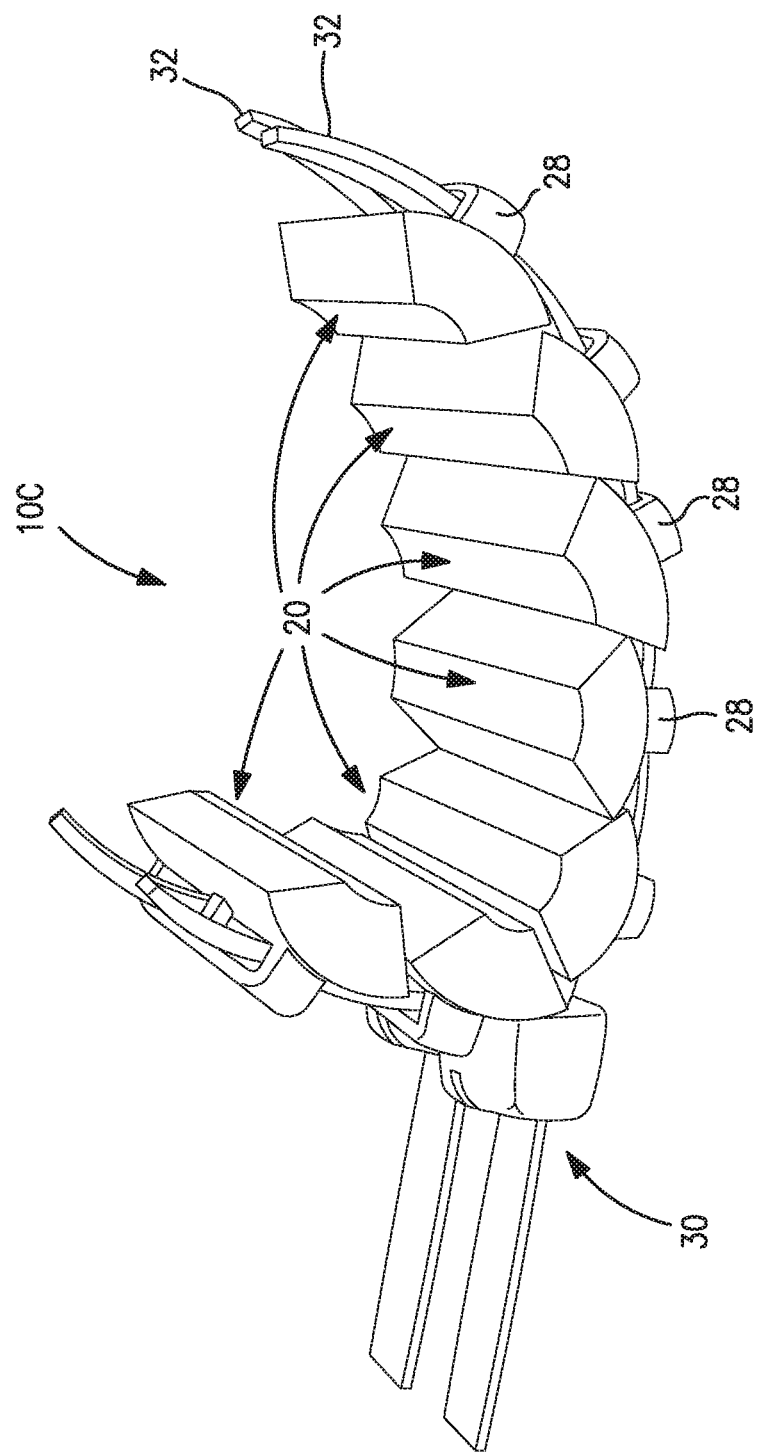
FIG. 9 is a perspective view of a strain relief, partly cut away to show detail.

The outer circumference of the buffer tube determines the number of spline-like grippers 20 that should be employed. Once the number of grippers is determined such as, for example, seven, for the tube as illustrated in FIGS. 1-3, five for the medium sized tube as illustrated in FIGS. 5 and 6, and four for a smaller tube as illustrated in FIGS. 7 and 8, the grippers 20 are connected together by looping the straps 32 in tandem through the loops 28. The grippers 20 are circumferentially positioned about the periphery of the buffer tube in longitudinal alignment. Each of the straps 32 is pulled through the loops 28 about the buffer tube and locked by the one-way catch 34. The strain relief and tube size variations are designated as strain relief 10B, 10C and buffer tube 12B, 12C in FIGS. 5 and 7, respectively.

It is important that the pressure of the grippers 20 against the tube 12 be distributed substantially uniformly about the buffer tube to maintain the roundness of the tube. There must be sufficient pressure to prevent longitudinal displacement of the assembled grippers 20 along the tube, but not enough to cause the tube to crush into the fiber optic strands 18.

It will be appreciated that the buffer tube strain relief 10 is mounted after the fiber optic cable buffer tube is exposed and positioned in the enclosure. Longitudinal ends 22 of the strain relief will then function as an abutment surface against the interior wall of the enclosure to prevent the pulling back or pulling out of the buffer tube from the enclosure.

In one form, the strain relief 10C has a pre-installed form with a select number of grippers for a given diameter which are connected together by a pair of ties. The assembly may then be simply wrapped around or placed over the buffer tube and the end of each strap inserted into the catch, and pulled and locked by the one-way catch to provide the proper securement to the buffer tube. In other embodiments, the separate grippers 20 and ties 30 are provided in a kit and assembled at the job site.

Figure 10:
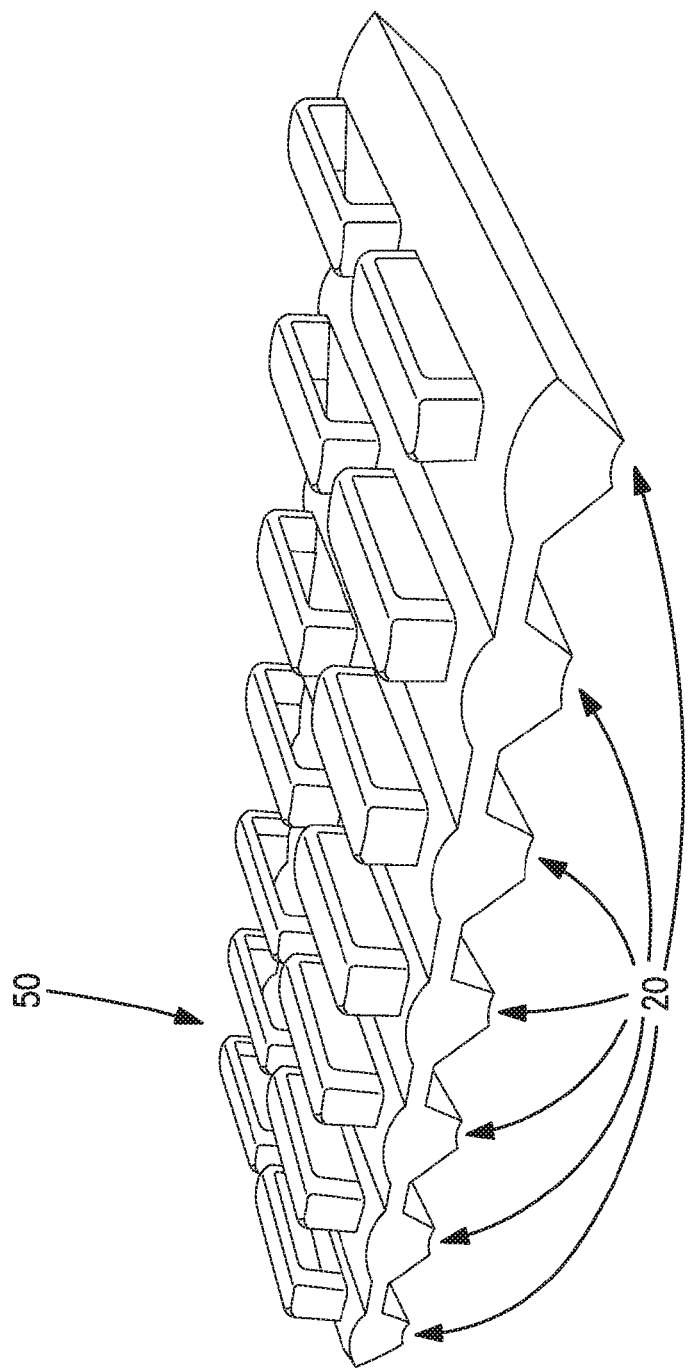
FIG. 10 is a perspective view of a portion of a ganged gripper embodiment of a strain relief for a buffer tube.

With reference to FIG. 10, for some strain relief embodiments, the grippers may be flexibly joined together in an integrated gripper assembly 50 to facilitate wrapping around the buffer tube having a given diameter.

The invention claimed is:

1. A strain relief for a buffer tube comprising:
   a plurality of elongated grippers each having a first surface extending a first distance and a second surface generally uniformly spaced from said first surface and extending a second distance greater than said first surface and having at least one integrally protruding retainer loop; and
   a pair of ties each comprising a one-way catch and a strap;
   wherein said grippers are angularly arrangeable about a buffer tube and each said strap is loopable through said retainer loops and pullable through said catch to secure said grippers in a fixed longitudinal position about said tube.

2. The strain relief of claim 1 wherein said grippers are made of rubber.

3. The strain relief of claim 1 wherein said grippers are substantially identical.

4. The strain relief of claim 1 wherein each gripper has two longitudinally spaced loops and said loops align in pairs longitudinally aligned relative to said buffer tube.

5. The strain relief of claim 1 wherein said first surface and said second surface are arcuate.

6. The strain relief of claim 1 wherein said grippers have a uniform length.

7. The strain relief of claim 1 wherein said grippers are flexibly joined.

8. The strain relief of claim 1 wherein each said gripper has an engagement end substantially perpendicular to said first surface and said second surface.

9. A strain relief for a buffer tube comprising:
   a plurality of elongated grippers each having a first surface and an opposed second surface generally uniformly spaced from said first surface and having at least one integrally protruding retainer loop; and
   a pair of ties each comprising a strap and a catch;
   wherein said grippers are angularly arrangeable about a buffer tube and each said strap is looped through retainer loops and securable by a said catch to secure said grippers in a fixed longitudinal position about said tube.

10. The strain relief of claim 9 wherein said grippers have an arcuate shape.

11. The strain relief of claim 9 wherein said grippers are substantially identical.

12. The strain relief of claim 9 wherein each gripper is substantially identical and has two longitudinally spaced outwardly projecting retainer loops.

13. The strain relief of claim 9 wherein each said tie has a strap with a series of serrations and a one-way catch.

14. A strain relief assembly comprising:
   a buffer tube;
   a plurality of elongated grippers angularly spaced about said buffer tube, each gripper having a first surface extending a first arcuate distance and a second surface spaced from said first surface and having two longitudinally spaced integrally protruding retainer loops aligned in longitudinal pairs relative to said buffer tube; and
   a tie comprising a strap extending through said loops and a one-way catch;
   wherein said strap pulled through said catch to secure said grippers in a fixed longitudinal position about said tube.

15. The strain relief assembly of claim 14 wherein said grippers are made of rubber or plastic and said tie is a cable tie.

16. The strain relief assembly of claim 14 wherein said grippers are substantially identical and each gripper has an end and said ends generally longitudinally align.

17. The strain relief assembly of claim 9 wherein each gripper has two longitudinally spaced integral loops and said loops align in pairs longitudinally aligned relative to said buffer tube.

18. The strain relief assembly of claim 14 further comprising a second tie comprising a strap looped through retainer loops and secured by a one-way catch.

19. The strain relief assembly of claim 14 wherein said grippers are generally equiangularly spaced about said buffer tube.

* * * * *